US012579892B2

(12) United States Patent
Ortiz Lopez et al.

(10) Patent No.: US 12,579,892 B2
(45) Date of Patent: Mar. 17, 2026

(54) TRAILER MERGE WARNING METHOD AND SYSTEM FOR A MOTOR VEHICLE

(71) Applicant: Continental Autonomous Mobility US, LLC, Auburn Hills, MI (US)

(72) Inventors: Carlos Armando Ortiz Lopez, Silao (MX); Juan Manuel Garcia Huerta, Querétaro (MX); Roberto Guzman Galan, Queretaro (MX); Vincey Chui, Chesterfield, MI (US); Dominik Froehlich, Ferndale, MI (US)

(73) Assignee: Continental Autonomous Mobility US, LLC, Frankfurt am Main (DE)

( * ) Notice: Subject to any disclaimer, the term of this patent is extended or adjusted under 35 U.S.C. 154(b) by 202 days.

(21) Appl. No.: 18/549,595

(22) PCT Filed: Mar. 8, 2022

(86) PCT No.: PCT/US2022/019355
§ 371 (c)(1),
(2) Date: Sep. 8, 2023

(87) PCT Pub. No.: WO2022/192267
PCT Pub. Date: Sep. 15, 2022

(65) Prior Publication Data
US 2024/0153389 A1 May 9, 2024

Related U.S. Application Data

(60) Provisional application No. 63/200,457, filed on Mar. 8, 2021.

(51) Int. Cl.
*G08G 1/16* (2006.01)
*G01S 13/931* (2020.01)

(52) U.S. Cl.
CPC ............ *G08G 1/167* (2013.01); *G01S 13/931* (2013.01); *G01S 2013/9315* (2020.01); *G01S 2013/93272* (2020.01)

(58) Field of Classification Search
CPC ............ G08G 1/167; G01S 2013/9315; G01S 13/931; G01S 2013/93272
See application file for complete search history.

(56) References Cited

U.S. PATENT DOCUMENTS

2009/0189781 A1* 7/2009 Taylor .................... G08G 1/167
340/903
2014/0176716 A1* 6/2014 Wallat ................... B60W 30/12
348/148

(Continued)

FOREIGN PATENT DOCUMENTS

EP 2983006 A1 2/2016
EP 3291205 A1 3/2018
WO 2006114206 A1 11/2006

OTHER PUBLICATIONS

The International Search Report and the Written Opinion of the International Searching Authority mailed on Jun. 27, 2022 for the counterpart PCT Application No. PCT/US2022/019355.

(Continued)

*Primary Examiner* — Sisay Yacob

(57) ABSTRACT

A trailer merge function of a tow vehicle includes receiving sensor data from one or more tow vehicle first sensors of an environment that is rearward of a connected tow vehicle. The method includes determining whether pattern associated with the sensor data matches a predetermined pattern corresponding to sensor data in which a field of view of the one or more first sensors is at least partly blocked by a trailer connected to the tow vehicle. Responsive to determining that the trailer at least partly obstructs the field of view of the one or more first sensors, sending a signal for warning a (Continued)

driver of the tow vehicle of lesser functionality of a trailer merge function, or increasing a reliance of one or more other sensors mounted to the tow vehicle, different from the one or more first sensors, in performing the trailer merge function.

12 Claims, 7 Drawing Sheets

(56)                References Cited

U.S. PATENT DOCUMENTS

| | | | | |
|---|---|---|---|---|
| 2014/0267688 | A1* | 9/2014 | Aich ..................... | B60W 30/00 |
| | | | | 348/113 |
| 2015/0120141 | A1* | 4/2015 | Lavoie ................. | B60W 30/06 |
| | | | | 701/41 |
| 2016/0101811 | A1* | 4/2016 | Kyrtsos ............. | B62D 15/0285 |
| | | | | 701/25 |
| 2017/0057413 | A1* | 3/2017 | Shehan ................. | G01S 15/931 |
| 2017/0363727 | A1* | 12/2017 | Prasad ................. | G08G 1/0962 |
| 2017/0363728 | A1* | 12/2017 | Prasad ................. | G01S 13/878 |
| 2018/0061239 | A1* | 3/2018 | Prasad ................. | G01S 13/867 |

OTHER PUBLICATIONS

European Examination Report dated Mar. 18, 2025 for the counterpart European Patent Application No. 22 717 299.6.

* cited by examiner

TRAILER MERGE WARNING METHOD AND SYSTEM FOR A MOTOR VEHICLE

CROSS REFERENCE TO RELATED APPLICATION

The present application is a National Stage Application under 35 U.S.C. $371 of International Patent Application No. PCT/US2022/019355 filed on Mar. 8, 2022, and claims the benefit of U.S. provisional patent application 63/200, 457, filed Mar. 8, 2021, and titled "Trailer Merge Warning Method and System for a Motor Vehicle," the content of these application is hereby incorporated by reference herein in their entirety.

TECHNICAL FIELD

This disclosure relates to a trailer merge warning method and system for a tow vehicle having a connected trailer, and particularly relates to a system which detects an obstructed field of view for at least one tow vehicle sensor and in response takes at least one remedial measure for operating the tow vehicle.

BACKGROUND

Some vehicles today include autonomous and/or semi-autonomous functionality for vehicles for use in connecting to a trailer and pulling the connected trailer. One such function is a trailer merge warning (TMW) system in which sensors disposed on the tow vehicle sense a vehicle is disposed in proximity with the tow vehicle and trailer and is located in an adjacent lane to the lane in which the tow vehicle and connected trailer are located, and warns the driver of the existence of the vehicle when the tow vehicle attempts to merge into the adjacent lane occupied by the vehicle.

However, when a connected trailer is appreciably wide and/or is appreciably close to the tow vehicle, the TMW system is unable to provide accurate and/or timely warnings using radar sensors that are mounted on or near the rear bumper of the tow vehicle because the wide/close trailer at least partly obstructs the field of view of the radar sensors. As a result, relatively wide trailers such as fifth wheel and gooseneck trailers present an additional challenge to TMW systems of the tow vehicle.

SUMMARY

Example embodiments of the present disclosure overcome shortcomings of existing TMW systems and satisfies a significant need. According to an example embodiment, a method for operating a trailer merge function of a tow vehicle includes receiving sensor data from one or more first sensors, mounted along a rearward portion of a tow vehicle, of an environment that is rearward of a tow vehicle. The method includes determining whether a pattern associated with the sensor data matches a predetermined pattern corresponding to sensor data in which a field of view of the one or more first sensors is at least partly blocked by a trailer connected to the tow vehicle to an extent to adversely affect trailer merge functionality. Responsive to determining that the trailer connected to the tow vehicle at least partly obstructs the field of view of the one or more first sensors to such an extent, the method sends a signal for warning a driver of the tow vehicle of lesser functionality of a trailer merge function, or increasing a reliance of one or more other sensors mounted to the tow vehicle, different from the one or more first sensors, in performing the trailer merge function.

The method may further include defining a region of interest in the sensor data, wherein the pattern associated with the sensor data comprises a pattern associated with the sensor data within the region of interest. In one aspect, the region of interest is located adjacent the trailer and extends beyond a rear portion of the trailer.

The one or more first sensors may include one or more radar sensors.

The pattern associated with the sensor data may include an amount of radar returns or radar return clusters at a rear portion of the region of interest being below a predetermined threshold corresponding to the predetermined pattern. In one aspect, the region of interest has a rectangular shape and the pattern associated with the sensor data comprises the amount of radar returns or radar return clusters in a space having a right triangle shape with a right angle corner of the right triangle shape being located at a corner of the region of interest in the rear portion of the region of interest nearest the trailer.

The trailer merge function may include, subsequent to increasing a reliance of one or more other sensors, detecting, by the one or more first sensors and the one or more other sensors, a presence of a second vehicle in proximity with the tow vehicle or the connected trailer and located in a lane on a roadway that is adjacent to a lane in which the tow vehicle and connected trailer are traveling, and warning the driver of the tow vehicle of the presence of the second vehicle following the tow vehicle and connected trailer initiating merging into the lane in which the second vehicle is located.

In another example embodiment, a trailer merge system for a tow vehicle is shown. The system includes data processing hardware and non-transitory memory having stored therein program code instructions which, when executed by the data processing hardware causes the data processing hardware to perform trailer merge system operations including receiving sensor data from one or more first sensors, mounted along a rearward portion of a tow vehicle, of an environment that is rearward of the tow vehicle. The operations include determining whether a pattern associated with the sensor data matches a predetermined pattern corresponding to sensor data in which a field of view of the one or more first sensors is at least partly blocked by a trailer connected to the tow vehicle to an extent to adversely affect trailer merge functionality. Responsive to determining that the trailer connected to the tow vehicle at least partly obstructs the field of view of the one or more first sensors, sending a signal for warning a driver of the tow vehicle of lesser functionality of a trailer function, or increasing a reliance of one or more other sensors mounted to the tow vehicle, different from the one or more first sensors, in performing the trailer merge function.

The operations may further include defining a region of interest in the sensor data, wherein the pattern associated with the sensor data comprises a pattern associated with the sensor data within the region of interest. The region of interest is located adjacent the trailer and extends beyond a rear portion of the trailer.

The one or more first sensors may include one or more radar sensors.

The pattern associated with the sensor data may include an amount of radar returns or radar return clusters at a rear portion of the region of interest being below a predetermined threshold corresponding to the predetermined pattern. In one aspect, the region of interest has a rectangular shape and the pattern associated with the sensor data includes the amount of radar returns or radar return clusters in a space having a right triangle shape with a right angle corner of the right triangle shape being located at a corner of the region of interest in the rear portion of the region of interest nearest the trailer.

The trailer merge function may include, subsequent to increasing a reliance of one or more other sensors, detecting, by the one or more first sensors and/or the one or more other sensors, a presence of a second vehicle in proximity with the tow vehicle and/or the connected trailer and located in a lane on a roadway that is adjacent to a lane in which the tow vehicle and connected trailer are traveling, and warning the driver of the tow vehicle of the presence of the second vehicle following the tow vehicle and connected trailer initiating merging into the lane in which the second vehicle is located.

BRIEF DESCRIPTION OF THE DRAWINGS

The present disclosure will become more fully understood from the detailed description and the accompanying drawings, wherein.

DESCRIPTION

Figure 1:
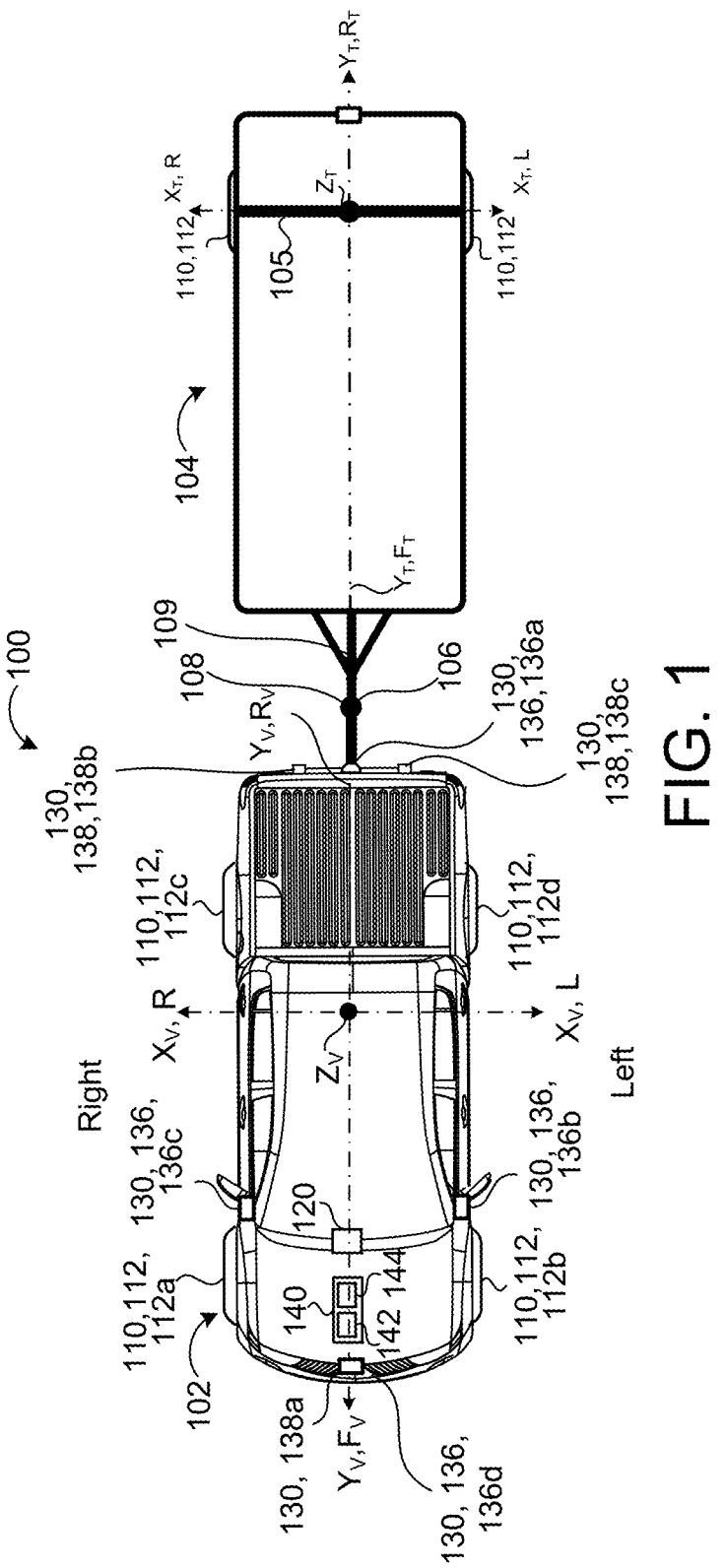
FIG. 1 is a schematic diagram of a tow vehicle hitched to a trailer.

The following description is merely exemplary in nature and is in no way intended to limit the disclosure, its application, or uses. For purposes of clarity, the same reference numbers will be used in the drawings to identify similar elements.

In general terms, example embodiments are directed to TMW system for a tow vehicle which determines whether a connected trailer obstructs a field of view of rearward facing radar sensors and upon an affirmative determination that the connected trailer obstructs the field of view of the radar sensors, the TMW system takes remedial measures, such as warning the driver of the tow vehicle of delayed and/or inaccurate TMW warnings or increasing the reliance upon sensor data obtained from other sensors mounted to the tow vehicle which are not obstructed by the connected trailer. Reliance upon such other sensors mitigates the connected trailer's obstruction of the field of view of the radar sensors and improves the warning performance for trailers that are relatively wide and/or are relatively close to a rear bumper of the tow vehicle.

Figure 2:
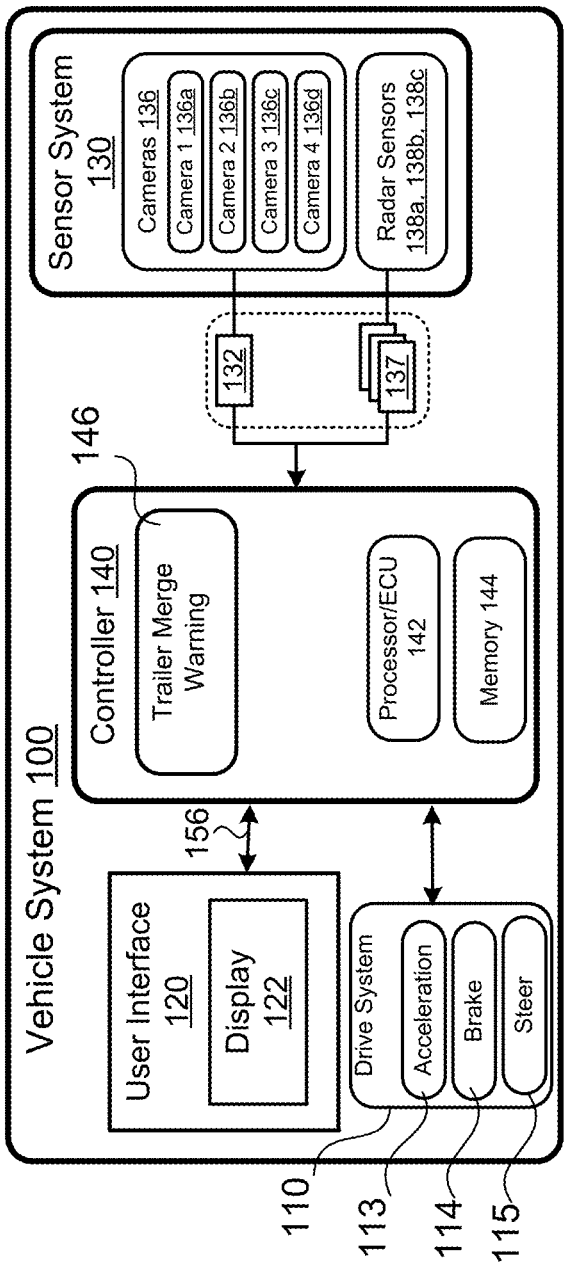
FIG. 2 is a block diagram of a vehicle system of the tow vehicle of FIG. 1.

Referring to FIGS. 1 and 2, in some implementations, a vehicle driving system 100 includes a tow vehicle 102 hitched to a trailer 104 by way of a hitch 106. The tow vehicle 102 may be but is not limited to a car, a crossover, a truck, a van, a sports-utility-vehicle (SUV), and a recreational vehicle (RV). The trailer 104 may be any type of trailer including, for example, a gooseneck trailer or a fifth wheel trailer. The tow vehicle 102 includes a drive system 110 associated with the tow vehicle 102 that maneuvers the tow vehicle 102 and thus the vehicle driving system 100 across a road or other surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 includes other components (not shown) that are in communication with and connected to the wheels 112 that allow the tow vehicle 102 to move, thus moving the trailer 104 as well. The drive system 110 may also include a brake system 114 that includes brakes associated with each wheel 112, 112a-d, where each brake 116 is associated with a wheel 112a-112d and is configured to slow down or stop the wheel 112a-112d from rotating. In some examples, the brake system 114 is connected to one or more brakes supported by the trailer 104. The drive system 110 may also include an acceleration system 113 that is configured to adjust a speed of the tow vehicle 102 and thus the vehicle driving system 100, and a steering system 115 that is configured to adjust a direction of the tow vehicle 102 and thus the vehicle driving system 100. The vehicle driving system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$, extends between a right side R and a left side L of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, the trailer 104 follows along.

Moreover, the trailer 104 follows the tow vehicle 102 across the road surface by various combinations of movements relative to three mutually perpendicular axes defined by the trailer 104: a trailer transverse (pitch) axis $X_T$, a trailer fore-aft (roll) axis $Y_T$, and a trailer central vertical (yaw) axis $Z_T$. The trailer transverse axis $X_T$, extends between a right side R and a left side L of the trailer 104, for example, along the trailer axle 105. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle driving system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, the trailer 104 follows along. While turning, the tow vehicle 102 and the trailer 104 form a trailer angle being an angle between the vehicle fore-aft axis $Y_V$ and the trailer fore-aft axis $Y_T$.

The tow vehicle 102 may include a user interface 120, such as a display 122. The user interface 120 is configured to display information to the driver of the tow vehicle. In some examples, the user interface 120 is configured to receive one or more user commands from the driver via one or more input mechanisms and/or displays one or more notifications to the driver on the display 122. In some examples, the one or more input mechanisms of the user interface 120 includes the display 122 being a touch screen display. In other examples, the one or more input mechanisms of the user interface 120 includes a rotary knob or a mouse to make a selection or otherwise provide information.

In some implementations, the tow vehicle 102 includes a sensor system 130 to provide sensor system data 132 that may be used to determine one or more measurements associated with an environment of the tow vehicle 102, the trailer 104, and/or objects surrounding the tow vehicle 102. In some examples, the sensor system 130 provides for reliable and robust autonomous or semi-autonomous driving. The sensor system 130 may include different types of sensors that may be used separately or with one another to create a perception of the tow vehicle's environment or a portion thereof that is used by the vehicle driving system 100 to determine measurements and/or identify object(s) in its environment and/or in some examples autonomously drive and make intelligent decisions based on objects and obstacles detected using the sensor system 130. The tow vehicle 102 may support the sensor system 130 while in other examples, the sensor system 130 is supported by both the tow vehicle 102 and the trailer 104. The sensor system 130 may include sensor(s) positioned on the rear vehicle bumper 108 and/or on the front bumper.

In some implementations, the sensor system 130 includes one or more imaging devices 136, 136a-136c, such as cameras. The one or more cameras 136, 136a-136c capture images of an environment of the tow vehicle 102. The cameras 136 may be used in providing a surround view of the tow vehicle 102. The imaging devices 136a-136d are mounted to the tow vehicle 102 at various locations, including rear-facing imaging device 136a mounted along a rear portion of the tow vehicle 102; side imaging devices 136b and 136c mounted along the sides of the tow vehicle 102; and front-facing imaging devices 136d mounted along the front portion of the tow vehicle 102.

The sensor system 130 further includes one or more radar sensors 138a-138c. Radar sensors 138a-138c are mounted on the tow vehicle 102. In the illustrated embodiment, radar sensor 138a is mounted along a front end portion of the tow vehicle 102, and radar sensors 138b and 138c are disposed along a rear end portion of the tow vehicle 102, such as along the rear bumper thereof.

The sensor system 130 may include other sensors, such as sonar sensors, LIDAR (Light Detection and Ranging) sensors which can entail optical remote sensing that measures properties of scattered light to find range and/or other information of a distant target), LADAR (Laser Detection and Ranging) sensors, ultrasonic sensors, etc. The other sensors may be positioned on the tow vehicle 102, such as on a rear portion of the tow vehicle.

The sensor system 130 provides camera data 132 that includes camera image(s) captured by the camera 136a-136c, and radar data 137 captured by the radar sensors 138a-138c. Therefore, the sensor system 130 is especially useful for receiving information of the environment or portion of the environment of the vehicle 102 and for increasing safety in the vehicle driving system 100 which may operate by the driver, or under semi-autonomous or autonomous conditions.

The drive system 110, the user interface 120, and the sensor system 130 are in communication with a vehicle controller 140 that includes a computing device (or data processing hardware) 142 (e.g., central processing unit having one or more computing processors) in communication with non-transitory memory or hardware memory 144 (e.g., a hard disk, flash memory, random-access memory) capable of storing program code instructions executable on the computing processor(s)). In some examples, the non-transitory memory 144 stores program code instructions which when executed on the computing device 142 cause the vehicle controller 140 to provide signals or commands which control or facilitate the control of the tow vehicle 102 in a forward or reverse maneuver, either autonomously or semi-autonomously. Such instructions at least include a TMW system 146. As shown, the vehicle controller 140 is supported by the tow vehicle 102; however, the vehicle controller 140 may be separate from the tow vehicle 102 and in communication with the tow vehicle 102 via a network (not shown).

In example embodiments, the TMW system 146 determines whether a connected trailer obstructs a field of view of the rearward facing radar sensors 138b-138c and upon an affirmative determination that the connected trailer obstructs the field of view of the radar sensors, the TMW system takes remedial measures. In determining whether the trailer 104 obstructs the field of view of the radar sensors 138b and 138c, the TMW system 146 uses pattern recognition to see whether a particular pattern in the sensor data 137 generated by the radar sensors 138b and 138c matches or nearly matches the expected pattern associated with a trailer that obstructs a field of view of a radar sensor, such as a trailer that is relatively wide and/or is relatively close to the tow vehicle.

Figure 3:
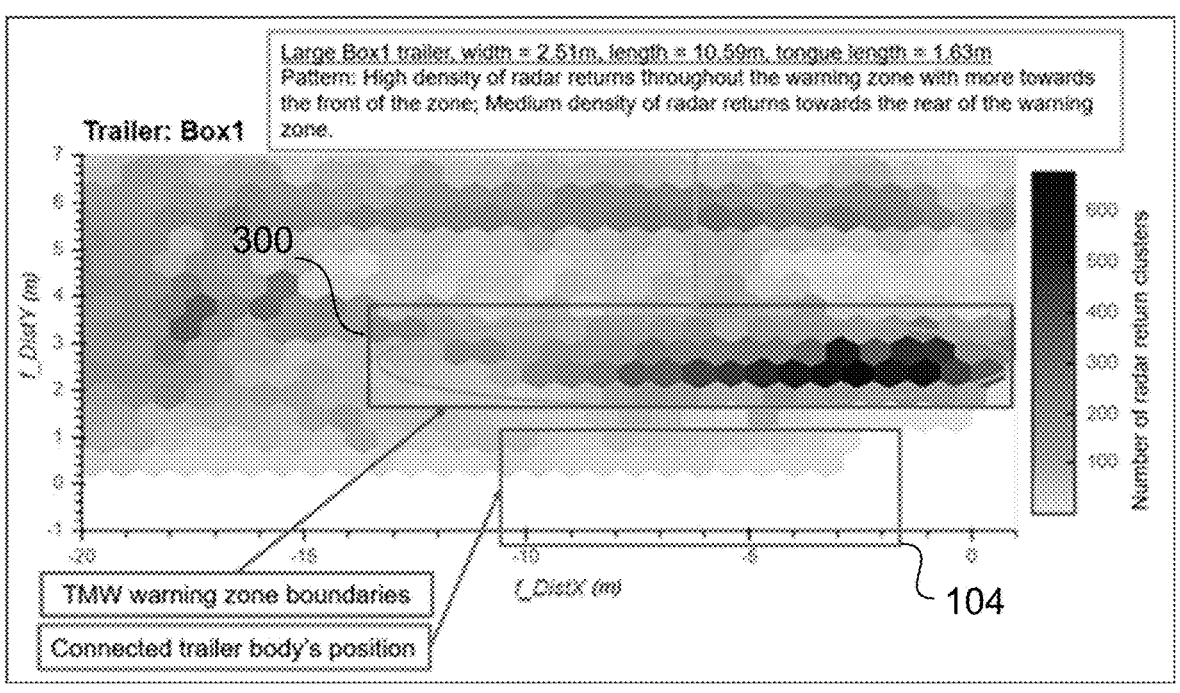
FIGS. 3-5 show radar sensor data from radar sensors on trailers having different widths and spacings to a tow vehicle.
Figure 4:
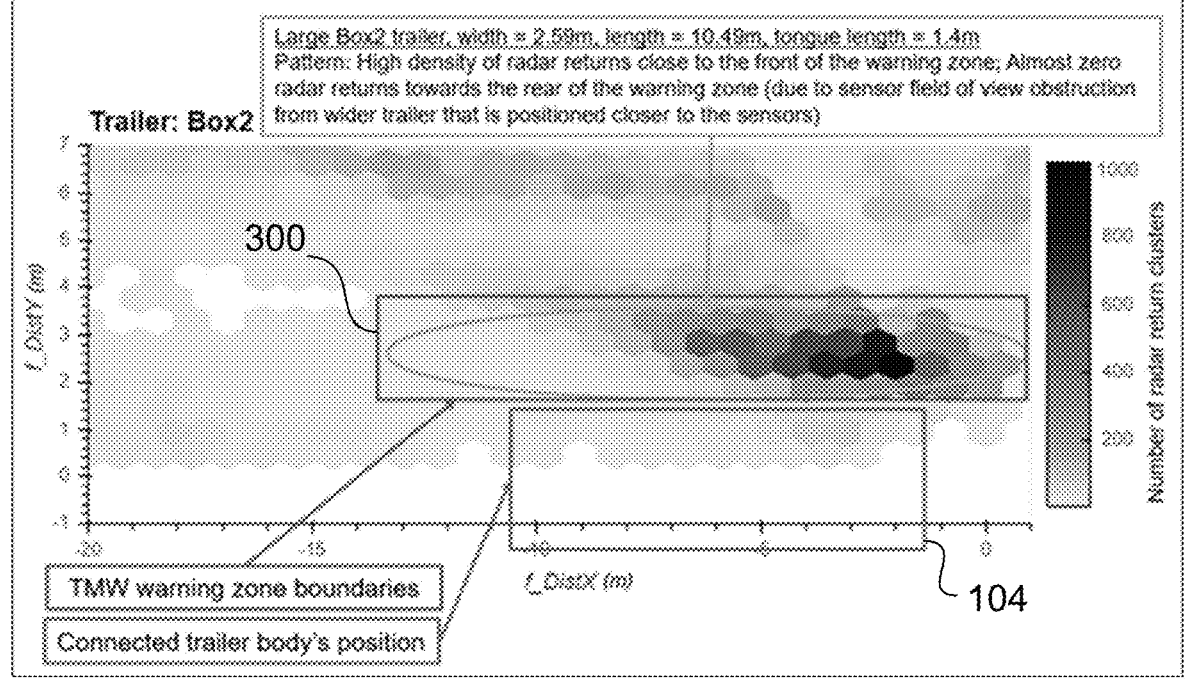
Figure 5:
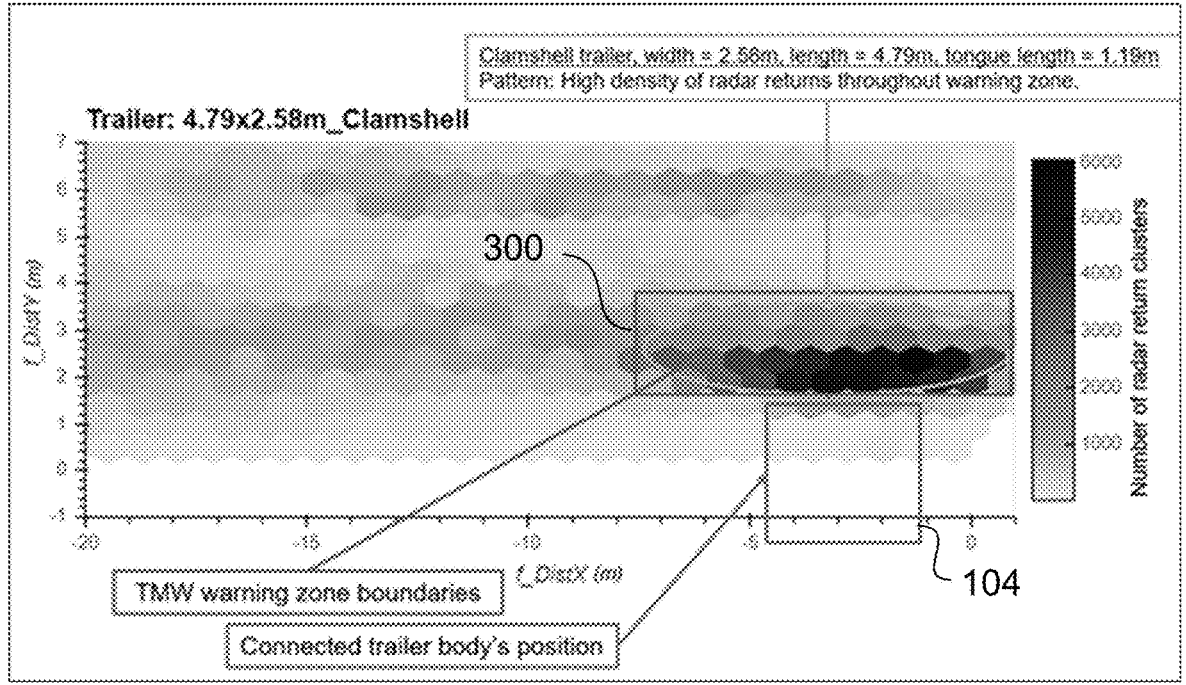

FIGS. 3-5 depict radar data received by three trailers having different dimensions, such as different widths and spacing to a tow vehicle. Each figure identifies the position of the connected trailer as well as a TMW warning which may be a region of interest or approximates a region of interest. The TMW zone 300 extends in the forward direction beyond the trailer position (i.e., towards the right in the drawing) and extends in the reverse direction beyond the trailer position boundary (i.e., towards the left in the drawing). The TMW zone 300 may extend in the forward direction to the location of the B-pillar of the tow vehicle. Each of FIGS. 3-5 shows the density of radar returns and/or the radar return clusters which varies from the rear portion of the TMW zone to the front portion thereof. Each figure shows greater density radar returns toward the forward (right) end of the TMW zone with the least density at the rear (left) end of the TMW zone 300. With relatively dense radar returns along the length (i.e., front to rear) of the trailer 104 position in FIG. 5, there is little obstruction by the trailer 104. The radar data of FIG. 3, with the relatively dense radar returns extending a majority, but not the entirety, of the length of the TMW zone 300, indicates some amount of obstruction of the field of view of the radar sensor. The radar data of FIG. 4, with the relatively dense radar return clusters extending only about half of the length of the TMW zone 300 with low density radar returns in the rear half of the TMW zone, indicates a greater obstruction of the field of view of the radar sensor relative to the radar return clusters of FIG. 3, which may be due to the particular dimensions of the trailer (width and tongue length).

Figure 6A:
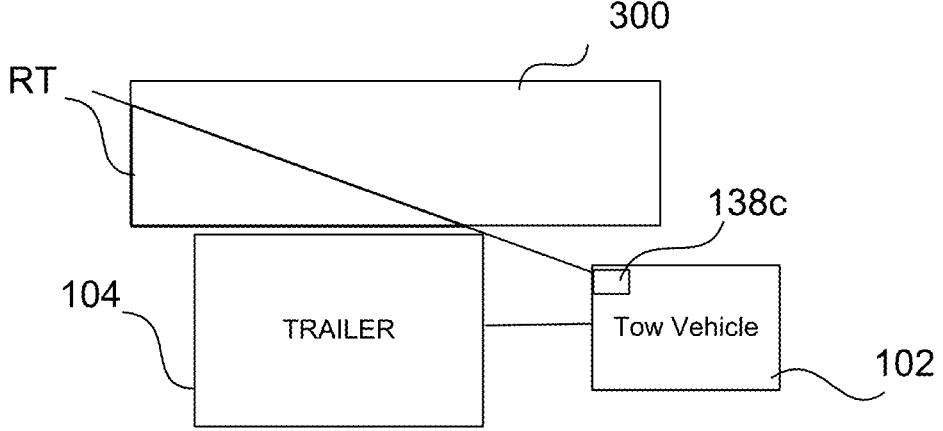
FIGS. 6A-6C illustrate the obstruction to the field of view of a radar sensor of tow vehicles in a zone or region of interest relative to a tow vehicle and connected trailer.
Figure 6B:
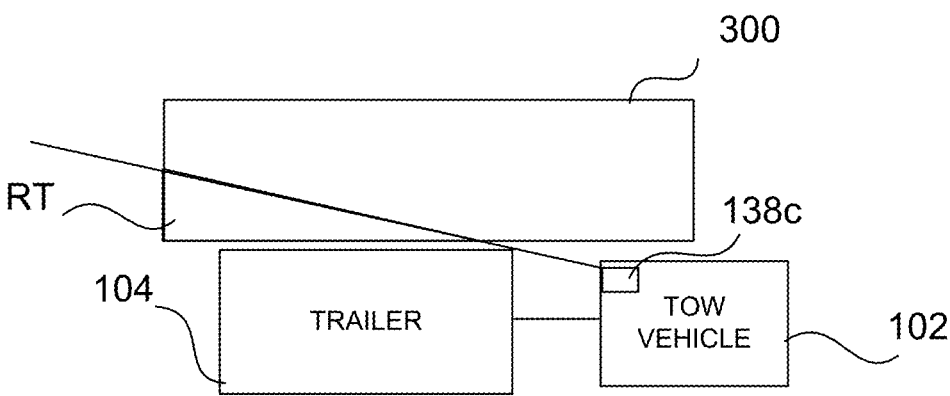
Figure 6C:
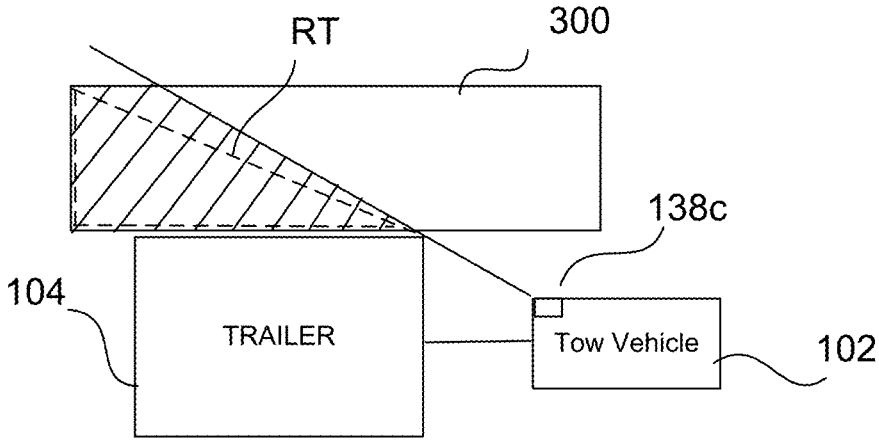

Based upon sets of radar data, such as shown in FIGS. 3 and 4, one can see the shape of the area of the TMW zone 300 being obstructed by the trailer 104 as approximating or otherwise include a right triangle having its right angle as the corner of the TMW zone that is at the rear of the TMW zone nearest the trailer 104. FIGS. 6A and 6B illustrate the trailer-obstructed areas of the field of view of a radar sensor for trailers 104 having different widths and tongue lengths, resulting in different (shaded) areas of obstruction forming different sized right triangles RT within the TMW zone 300. FIG. 6C illustrates the trailer-obstructed (shaded) area of the field of view of a radar sensor 138*c* for an especially wide trailer 104 having an area that includes a right triangle RT within the TMW zone 300. By identifying the absence or near absence of radar returns in an area at least approximating a right triangle RT of a TMW zone or region of interest, the TMW system 146 determines that the trailer 104 obstructs the field of view of the radar sensors 138*b* and 138*c*, according to an example embodiment.

Figure 7:
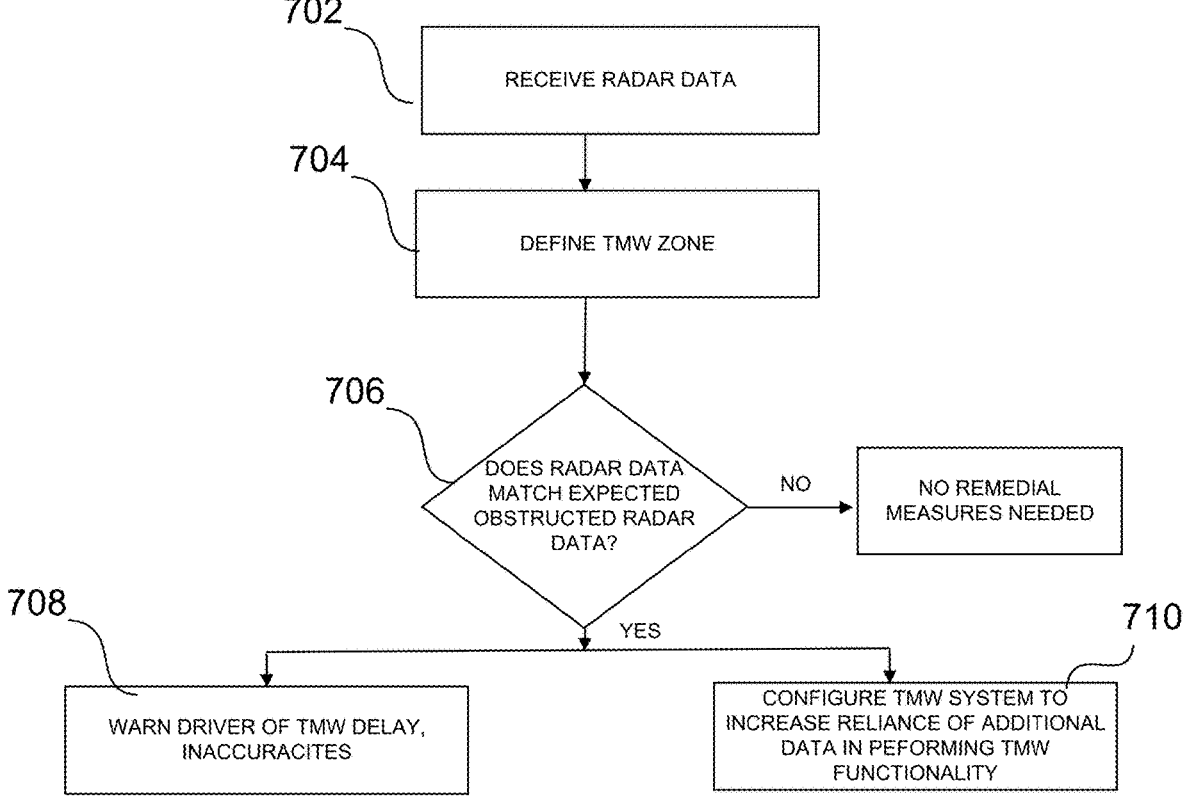
FIG. 7 illustrates a method of operation of a TMW system of the tow vehicle of FIG. 1.

FIG. 7 shows a flowchart illustrating the operation of the TMW system 146 according to an example embodiment. The operation may be performed, for example, relatively soon after initially operating the tow vehicle 102. Sensor data, such as radar data from radar sensors 138*b* and 138*c*, are received by the data processing hardware 142 at 702. At 704, the data processing hardware 142 determines, relative to the received sensor data, the location of the tow vehicle 102, the trailer 104 and the corresponding TMW warning zone or region of interest. At 706, the data processing hardware 142 determines whether the received sensor data indicates that at least a portion of a field of view of the radar sensors 138*b* and 138*c* is obstructed. This determination includes determining, based upon pattern recognition, whether radar data matches an expected pattern for trailers that are too wide or too close to a tow vehicle to at least partly obstruct a field of view of radar sensors positioned along the rear of a tow vehicle. Specifically, this determination may involve determining whether the radar data shows a distribution of radar return densities in which a higher density appears along the front portion of the TMW zone 300 and a lower density is located along the rear portion of the TMW zone. More particularly, this determination may include determining whether the density of radar returns in the TMW zone 300 falls below a predetermined density threshold in the rear portion of the zone, and may include determining whether the radar return density falls below the predetermined threshold in an area at least generally shaped as a right triangle whose right angle corner forms the corner of the rear of the TMZ zone nearest the trailer, or including such a right triangle. The pattern recognition determines whether the pattern in the received sensor data matches at least one expected pattern of a trailer 104 that is too wide and/or too close to the tow vehicle 102 to support with the TMW merge system 146.

Upon a determination that the received radar data does not match an expected pattern of a trailer that obstructs the field of view of tow vehicle too much to support desired TMW merge warning functionality, the data processing hardware 142 takes no further action and TMW warning related operations may be performed during normal operation of the tow vehicle 102. In the even the data processing hardware 142 determines that the received radar data matches an expected pattern of a trailer that obstructs the field of view of tow vehicle radar sensors too much to fully support desired TMW merge warning functionality, the data processing hardware 142 sets an obstruction detection flag to TRUE and transmits at 708 an instruction to warn the driver of the tow vehicle 102 that the trailer 104 may be too wide and/or too close to the trailer 102 to support accurate trailer merge warnings and/or that warnings provided by the TMW system 146 may be delayed. By warning the driver in this way, the driver is able to form more reasonable expectations of the TMW system 146 while the trailer 104 is connected to the tow vehicle 102. The driver warning may be provided via the user interface 120 as at least one of a visual warning, an audio warning and a haptic warning. As such the instruction may be sent by the controller 140 to the user interface 120.

In another implementation, in the event the data processing hardware 142 determines that the received radar data matches an expected pattern of a trailer that obstructs the field of view of tow vehicle radar sensors too much to fully support desired TMW merge warning functionality, the data processing hardware 142 sets an obstruction detection flag to TRUE and at 710 takes steps to provide more accurate and more timely warnings to the driver of the tow vehicle. Specifically, the TMW system 146 increases the reliance on one or more other sensors 130, such as other one or more sensors mounted to the tow vehicle 102, whose field(s) of view is not marked obstructed by the trailer 104, for performing TMW warning functions. For example, sensor data from cameras 136*a*-136*c* which are mounted to the tow vehicle 102 may be used along with the radar sensors 138*b*-138*c*. In this way, the TMW system 146 is able to perform as expected despite the obstruction to the field of view of the radar sensors 138*b*-138*c* by the trailer 104.

In another example embodiment, both blocks 708 and 710 are performed responsive to an affirmative determination that the received radar data matches an expected pattern of a trailer that obstructs the field of view of tow vehicle radar sensors too much to fully support desired merge warning functionality.

In an example embodiment, the TMW system 146 may utilize image data from a camera(s) 136 which covers the TMW zone and/or region of interest, in addition to using radar sensors data from radar sensors 138*b* and 138*c*, in performing TMW system functions. For example, an algorithm of the TMW system 146 may use a Kalman filter and the algorithm can take in different measurements and can tune the reliance of the system inputs. In this way, the TMW system 146 may rely more on radar data from radar sensors 138*b* and 138*c* at some times and rely more on data from other sensors 130 at other times.

A number of implementations have been described. Nevertheless, it will be understood that various modifications may be made without departing from the spirit and scope of the disclosure. Accordingly, other implementations are within the scope of the following claims.

What is claimed is:

1. A method for operating a trailer merge warning function of a tow vehicle, the method comprising:

receiving sensor data from one or more first sensors, mounted along a rearward portion of a tow vehicle, of an environment that is rearward of a tow vehicle;

determining, by data processing hardware having at least one processor, whether a pattern associated with the sensor data matches a predetermined pattern corresponding to sensor data in which a field of view of the one or more first sensors is at least partly blocked by a trailer connected to the tow vehicle to an extent to adversely affect trailer merge functionality, further comprising defining a region of interest in the sensor data, wherein the pattern associated with the sensor data comprises a pattern associated with the sensor data within the region of interest, wherein the region of interest is located adjacent the trailer and extends beyond a rear portion of the trailer, wherein the region of interest has a rectangular shape and the pattern associated with the sensor data comprises the amount of radar returns or radar return clusters in a space having a right triangle shape with a right angle corner of the right triangle shape being located at a corner of the region of interest in the rear portion of the region of interest nearest the trailer; and responsive to determining that the trailer connected to the tow vehicle at least partly obstructs the field of view of the one or more first sensors, sending, by the data processing hardware, a signal for warning a driver of the tow vehicle of lesser functionality of a trailer merge function, or increasing a reliance of one or more other sensors mounted to the tow vehicle, different from the one or more first sensors, in performing the trailer merge function.

2. The method of claim 1, wherein the one or more first sensors comprises one or more radar sensors.

3. The method of claim 2, wherein the pattern associated with the sensor data comprises an amount of radar returns or radar return clusters at a rear portion of the region of interest being below a predetermined threshold corresponding to the predetermined pattern.

4. The method of claim 1, wherein the trailer merge function comprises, subsequent to increasing a reliance of one or more other sensors, detecting, by the one or more first sensors and the one or more other sensors, a presence of a second vehicle in proximity with the tow vehicle or the connected trailer and located in a lane on a roadway that is adjacent to a lane in which the tow vehicle and connected trailer are traveling, and sending, by the data processing hardware, a second signal warning the driver of the tow vehicle of the presence of the second vehicle following the tow vehicle and connected trailer initiating merging into the lane in which the second vehicle is located.

5. A trailer merge warning system for a tow vehicle, the tow vehicle comprising data processing hardware and non-transitory memory having stored therein program code instructions which, when executed by the data processing hardware causes the data processing hardware to perform trailer merge system operations comprising:

receiving sensor data from one or more first sensors, mounted along a rearward portion of a tow vehicle, of an environment that is rearward of the tow vehicle;

determining whether a pattern associated with the sensor data matches a predetermined pattern corresponding to sensor data in which a field of view of the one or more first sensors is at least partly blocked by a trailer connected to the tow vehicle to an extent to adversely affect trailer merge functionality, further comprising defining a region of interest in the sensor data, wherein the pattern associated with the sensor data comprises a pattern associated with the sensor data within the region of interest, wherein the region of interest is located adjacent the trailer and extends beyond a rear portion of the trailer, wherein the region of interest has a rectangular shape and the pattern associated with the sensor data comprises the amount of radar returns or radar return clusters in a space having a right triangle shape with a right angle corner of the right triangle shape being located at a corner of the region of interest in the rear portion of the region of interest nearest the trailer; and responsive to determining that the trailer connected to the tow vehicle at least partly obstructs the field of view of the one or more first sensors, sending a signal for warning a driver of the tow vehicle of lesser functionality of a trailer function, or increasing a reliance of one or more other sensors mounted to the tow vehicle, different from the one or more first sensors, in performing the trailer merge function.

6. The system of claim 5, wherein the one or more first sensors comprises one or more radar sensors.

7. The system of claim 6, wherein the pattern associated with the sensor data comprises an amount of radar returns or radar return clusters at a rear portion of the region of interest being below a predetermined threshold corresponding to the predetermined pattern.

8. The system of claim 5, wherein the trailer merge function comprises, subsequent to increasing a reliance of one or more other sensors, detecting, by the one or more first sensors and/or the one or more other sensors, a presence of a second vehicle in proximity with the tow vehicle and/or the connected trailer and located in a lane on a roadway that is adjacent to a lane in which the tow vehicle and connected trailer are traveling, and warning the driver of the tow vehicle of the presence of the second vehicle following the tow vehicle and connected trailer initiating merging into the lane in which the second vehicle is located.

9. A non-transitory, computer readable medium having stored therein program instructions which, when executed by at least one processor, causes the at least one processor to perform a method comprising:

receiving sensor data from one or more first sensors, mounted along a rearward portion of a tow vehicle, of an environment that is rearward of the tow vehicle;

determining whether a pattern associated with the sensor data matches a predetermined pattern corresponding to sensor data in which a field of view of the one or more first sensors is at least partly blocked by a trailer connected to the tow vehicle to an extent to adversely affect a trailer merge function, further comprising defining a region of interest in the sensor data, wherein the pattern associated with the sensor data comprises a pattern associated with the sensor data within the region of interest, wherein the region of interest is located adjacent the trailer and extends beyond a rear portion of the trailer, wherein the region of interest has a rectangular shape and the pattern associated with the sensor data comprises the amount of radar returns or radar return clusters in a space having a right triangle shape with a right angle corner of the right triangle shape being located at a corner of the region of interest in the rear portion of the region of interest nearest the trailer; and responsive to determining that the trailer connected to the tow vehicle at least partly obstructs the field of view of the one or more first sensors, sending a signal for warning a driver of the tow vehicle of lesser functionality of a trailer function, or increasing a reliance of one or more other sensors mounted to the tow vehicle, different from the one or more first sensors, in performing the trailer merge function.

10. The computer readable medium as recited in claim 9, wherein the trailer merge function comprises, subsequent to increasing a reliance of one or more other sensors, detecting, by the one or more first sensors and/or the one or more other sensors, a presence of a second vehicle in proximity with the tow vehicle and/or the connected trailer and located in a lane on a roadway that is adjacent to a lane in which the tow vehicle and connected trailer are traveling, and warning the driver of the tow vehicle of the presence of the second vehicle following the tow vehicle and connected trailer initiating merging into the lane in which the second vehicle is located.

11. The computer readable medium of claim 9, wherein the one or more first sensors comprise one or more radar sensors.

12. The computer readable medium of claim 11, wherein the pattern associated with the sensor data comprises an amount of radar returns or radar return clusters at a rear portion of the region of interest being below a predetermined threshold corresponding to the predetermined pattern.

\* \* \* \* \*